United States Patent [19]
Bonfilio

[11] Patent Number: 5,761,970
[45] Date of Patent: Jun. 9, 1998

[54] DAMPING FLYWHEEL, PARTICULARLY FOR MOTOR VEHICLES

[75] Inventor: Ciriaco Bonfilio, Clichy, France

[73] Assignee: Valeo, Paris, France

[21] Appl. No.: 646,231

[22] PCT Filed: Sep. 8, 1995

[86] PCT No.: PCT/FR95/01154

§ 371 Date: May 9, 1996

§ 102(e) Date: May 9, 1996

[87] PCT Pub. No.: WO96/07837

PCT Pub. Date: Mar. 14, 1996

[30] Foreign Application Priority Data

Sep. 9, 1994 [FR] France .................. 94 10880

[51] Int. Cl.⁶ .................. F16D 13/60; F16F 15/12; F16F 15/20
[52] U.S. Cl. .................. 74/574; 74/572; 74/573 R; 192/70.14
[58] Field of Search .................. 192/70.14, 70.17, 192/70.18, 70.19, 70.2, 70.13, 70.27; 74/572–574

[56] References Cited

U.S. PATENT DOCUMENTS

| | | |
|---|---|---|
| 5,073,143 | 12/1991 | Friedman et al. . |
| 5,476,166 | 12/1995 | Schierling et al. .................. 192/70.14 |
| 5,575,183 | 11/1996 | Schierling et al. .................. 74/574 |
| 5,597,059 | 1/1997 | Gebauer et al. .................. 192/70.12 |

FOREIGN PATENT DOCUMENTS

| | | |
|---|---|---|
| 2089765 | 1/1972 | France . |
| 2618199 | 1/1989 | France . |
| 2695579 | 3/1994 | France . |
| 2700192 | 7/1994 | France . |
| 3629225 | 3/1987 | Germany . |
| 8718035 | 11/1992 | Germany . |
| 4307830 | 9/1993 | Germany . |
| 2234574 | 2/1991 | United Kingdom . |

*Primary Examiner*—Vinh T. Luong
*Attorney, Agent, or Firm*—Longacre & White

[57] ABSTRACT

A damping flywheel having a support plate (24) and an axially elongated crown secured to the support plate (24). The support plate (24) is provided with a radially projecting collar portion and the crown element has a flank for fastening to the support plate (24).

10 Claims, 3 Drawing Sheets

DAMPING FLYWHEEL, PARTICULARLY FOR MOTOR VEHICLES

BACKGROUND OF THE INVENTION

1. Field of the Invention

The present invention relates to damped flywheels, especially for motor vehicles, of the kind comprising two coaxial masses mounted for movement of one with respect to the other against the action of circumferentially acting resilient means.

2. Description of the Prior Art

Such a flywheel is described in the document FR-A-92 10 958 published under the number FR-A-2 695 579.

In the latter, the first mass, i.e. the one which is arranged to be fixed to the driving shaft (which is the crankshaft of the internal combustion engine in this case), comprises firstly an axially elongated crown element which carries a starter crown, and secondly, a thinner radial support plate and a disc, which are fixed to the crown element by seaming. The other mass is adapted to be mounted on a driven shaft (i.e. the input shaft of the gearbox in this case), for rotation with the latter.

This arrangement enables sealing to be provided for a cavity which encloses the resilient members, and does not have the disadvantages of riveting, which, in order to provide for the fitting of the necessary rivets, takes up some amount of space in the radial direction.

Because space is economised, it is possible, all things being equal, to locate the resilient members on a circle having an increased diameter, and this leads to an increase, in particular, in the torque that can be transmitted.

In practice, in that document, the radial support plate is of steel, so that during the seaming operation, plastic flow into a groove, formed in the cast crown element can easily be obtained, with the seaming operation leaving a scar on the said radial plate.

As a result, in order that the seaming operation can be carried out, the crown element must have a thickness which takes account of the thickness of the seaming tool and of the size of the groove, and there must be a certain amount of material between the outer periphery of the crown element and its groove, for reasons of mechanical strength. Similarly, the shoulder of the crown element on which the radial plate engages must have a radial depth which takes account of the seaming tool.

As a result, for a given radial size of the damped flywheel, it is not possible to position the resilient members on a circle having an increased diameter.

An additional disadvantage is that, the crown element being a casting, the first mass is not as resistant to centrifugal force as is desirable.

In addition, the radial plate is unable to be made in complex forms.

An object of the present invention is to overcome these drawbacks in a simple and inexpensive way, and accordingly to provide a primary mass which enables the resilient members to be located at an increased diameter, while having improved resistance to the effects of centrifugal force and also affording the possibility of giving the support member for the crown element forms of greater complexity.

SUMMARY OF THE INVENTION

According to the invention, a damped flywheel of the type described above, having a first mass which includes a crown element elongated axially and mounted on a support member, with seaming means being interposed between the said crown element and the said member so as to lock them together, is characterised in that the support member consists of a support plate of mouldable material, in that the crown element is of steel, in that the support plate has at its outer periphery a collar portion projecting radially with a generally axially oriented mounting surface and a generally transversely oriented seaming shoulder, and in that the crown element has a flank for fastening it to the support plate, defining an internal housing for the said collar portion, with a fitting surface which is oriented generally axially and which is initially longer than the mounting surface, such that, after the fitting surface has been fitted over the mounting surface, the material of the end of the fastening flank is upset into contact with the seaming shoulder so as to fasten the crown element on the support plate.

Thanks to the invention, the support plate, which is thicker than the radial support plate of the prior art, may easily be given a complex form by moulding.

The said plate preferably has at least some housings for the resilient members.

This favours a reduction in costs, and also a reduction in the overall axial size of the flywheel.

The said plate also has a sleeve portion which is radially inward of the resilient members and which serves for the fitting of friction means and sealing rings.

The said plate may have a central internal hub, enabling a bearing to be fitted for the rotary mounting of the second mass.

Thanks to the invention, there can be a small thickness of material between the fitting surface and the outer periphery of the crown element, which enables the diameter on which the resilient members are fitted to be increased.

The steel crown enables good seaming to be obtained, and also an increase in inertia and increased resistance to centrifugal force.

In addition, good sealing is obtained. It will be appreciated that the assembly is manufactured inexpensively with a reduced number of components, without recourse being had to fastening members or to welding operations.

It is possible to increase axial length, by comparison with a cast crown element, giving the benefit of an additional gain in inertia.

Having regard to the mechanical strength of steel, it is possible to position the resilient members over a larger diameter, especially since the collar portion of the support plate and the fastening flank of the crown element enable such an increase to be obtained by virtue of the invention.

All of this enables one stage of internal resilient members to be omitted, thus reducing wear and friction.

It is possible easily to fasten, by welding on the crown element, a disc which defines a sealed cavity with the said crown element and the said recessed plate, for accommodating the resilient members. Good sealing is thus obtained inexpensively.

In one embodiment, the collar portion is cylindrical and includes an axial surface which is delimited by two transverse shoulders. In that case, the housing in the fastening flank of the crown element has a frontal shoulder for cooperation with the appropriate shoulder of the collar portion.

In another version, the engagement and mounting surfaces are oriented generally axially, and are of frusto-conical form.

In one embodiment, the support plate carries at its outer periphery a hoop such as a starter crown.

This hoop has an internal bore which is flared in such a way that a thin band of material may be present between the resilient members and the flare of the hoop. All of this leads to an increase in the diameter on which the resilient members are fitted.

In general terms, the hoop is a safety element, because it is fitted close to the seaming shoulder, so that any danger of the components coming apart is prevented because the upset end portion is trapped between the hoop and the seaming shoulder, and is therefore unable to escape.

The following description illustrates the invention with reference to the attached drawings, in which:

DETAILED DESCRIPTION OF THE PREFERRED EMBODIMENTS

Figure 1:
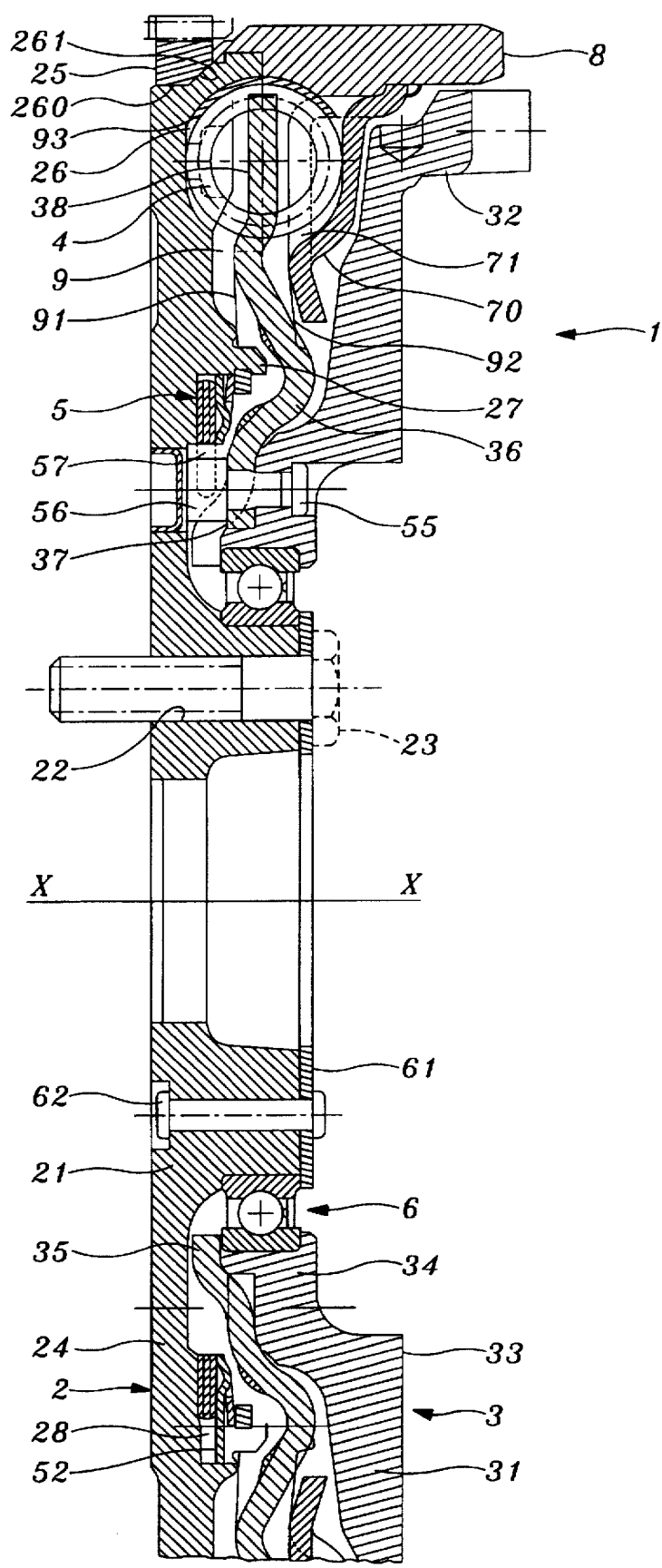
FIG. 1 is a view in axial cross section showing part of a damped flywheel in accordance with the invention.

The drawings show at 1 a damped flywheel, usually referred to as a double damped flywheel, for a motor vehicle, comprising two coaxial masses 2, 3 which are mounted for movement of one with respect to the other against the action of circumferentially acting resilient means 4 and friction means 5. This flywheel is of the same type as that which is described in the document FR-A-94 08 324 filed on 30 Jun. 1994.

Accordingly, the first mass 2 has a central internal hub 21, which is formed with a plurality of holes 22 which are spaced apart at regular intervals on a pitch circle and through which there pass studs 23 which fasten the mass 2 to the crankshaft of the internal combustion engine of the motor vehicle that constitutes a driving shaft.

The hub 21 is, in this example, integral with a support plate 24, forming a support member 3 and extending generally transversely away from the axis X—X of the assembly.

In another version, the hub 21 may be carried on the central portion of the plate 24, which carries at its outer periphery a starter crown 25 in the form of a hoop.

The plate 24 is of complex form and is recessed locally at its outer periphery so as to define projecting elements 26, which serve as abutments for the circumferential ends of curved helical springs 4, which in this example are preformed to their curved shape and which constitute the circumferentially acting resilient means. In another version, the projecting elements 26 consist of separate members which are sealingly attached by riveting on the plate 24.

The support plate 24 is configured between the projecting elements 26 in such a way as to receive, and to lodge sealingly, the springs 4 which are of the coil spring type, and which may be of variable pitch. The plate 24 is recessed for this purpose.

Radially inwardly of the projecting elements 26 and springs 4, the plate 24 has an integral, axially orientated sleeve portion 27 which extends towards the second mass 3. The sleeve portion 27 lies radially outwardly of the internal hub 21.

The free end of the sleeve portion 27 has an internal groove for receiving a circlip 51.

The internal bore of the sleeve portion 27 also has at least one axial groove 27, which defines a mortice for receiving a complementary radial lug 52 which is part of a thrust ring 53.

This thrust ring 53, which is of metal in this example, is acted on by an axially acting resilient ring 54, which in this example is of the Belleville ring type and which bears on the circlip 51 so that a friction liner 54, in this example of a synthetic material, is gripped between the said ring 53 and the plate 24 (i.e. the face of the latter that faces towards the second mass 3).

The second mass 3 includes a plate 31, which in this example is a casting, and which has at its outer periphery an axially oriented annular skirt portion 32, which may be of divided form and which serves, in a manner known per se, for fastening a cover plate of a clutch mechanism (not shown) which includes a pressure plate acted on by a diaphragm which bears on the cover plate.

The outer surface 33 of the plate 31, which faces away from the plate 24, serves as a friction surface for a clutch disc (not shown) which has at its outer periphery friction liners which are fixed to a support coupled to a hub, which is adapted to be mounted on the input shaft of the gearbox, constituting a driven shaft, for rotation with the latter. The friction liners of the clutch disc are adapted to be gripped between the reaction plate 31 and the pressure plate under the action of the diaphragm, which is manoeuvrable with the aid of a clutch release bearing (not shown).

Thus the plate 31, and therefore the second mass 3, is releasably mounted in rotation on the input shaft of the gearbox.

The plate 31 has at its inner periphery an outer hub 34 which partly surrounds the inner hub 21.

A bearing 6, which in this example is a ball bearing, is interposed radially between the two hubs 21, 34, each of which has a shoulder for the axial location of the inner and outer rings, respectively, of the rolling bearing 6.

The inner ring is located axially in the other direction by a ring 61, which is fixed to the hub 21 by means of a plurality of rivets 62. This ring 61 also serves for engagement by the head of the fastening studs 23.

The outer ring of the rolling bearing 6 is located axially in the other direction by means of lugs 35 which are formed at the inner periphery of a damper plate 36, which in this example is of press-formed metal plate and which is fixed to the hub 34 and to the plate 31 by means of rivets 55 passed through lugs 37. The damper plate 36, which is interposed axially between the plates 24, 31, is part of the second mass 3 and accordingly has at its inner periphery a plurality of lugs 35, 37, offset axially from each other, for locating the rolling bearing 6 and for fastening the damper plate 36, respectively.

The damper plate 6 has a serpentine central profile so as not to interfere with the sleeve portion 27, and so as to pass around the latter. The head 56 of each rivet 55 is in the form of a spigot, for meshing, with or without a circumferential clearance, with the friction ring 54, which for this purpose has at its inner periphery slots 57 for meshing with the heads 56.

During the relative movement between the masses, 2, 3, the ring 54 is driven by the rivets 55, optionally after a clearance has been taken up, so that friction occurs between the ring 54 on the one hand and the plate 24 and ring 53 on the other hand.

The friction means 5 are thus carried mainly by the mass 2, i.e. by its sleeve portion 27, and comprise the rings 51, 53, 54 together with the rivets 55 of the second mass 3. The presence of holes (not designated by reference numerals), which enable the damper plate 36 to be riveted by means of the rivets 55, will be noted. Following this riveting operation, a bung (not given a reference numeral) is fitted into each of the said holes.

The metallic damper plate 36 has at its outer periphery transverse arms 38 which are interposed, with or without a circumferential clearance according to the application, between the circumferential ends of the springs 4 bearing on the projecting elements 26, and, in facing relationship with the projecting elements, on embossed portions 71 of a disc 70, which in this example is of metal (and which is of press-formed metal plate).

The plate 24 and the disc 70 are thus arranged on either side of the damper plate 36. To this end, the disc 70 is carried on, and fastened to, an axially oriented annular crown element 8 of the first mass 2, which is disposed at the outer periphery of the latter.

This crown element 8 is fixed to the support plate 24, being mounted on the latter in a manner to be described later herein. In a manner known per se, a sealed cavity 9, which is carried mostly by the mass 2, is bounded by the plate 24, the crown element 8 and the disc 70. This cavity 9 is partially filled with grease in order to lubricate the springs 4 contained within the cavity 9, as well as the arms 38 of the damper plate 36. The said cavity is closed internally and sealed, by two sealing rings 91, 92 which are disposed on either side of the damper plate 36. These rings 91, 92, which in this example are of metal, are fitted under precompression. The ring 91 bears at its outer periphery on a bead of the damper plate 36, and at its inner periphery on a bead of the plate 24, which is formed at the outer periphery of the sleeve portion 27.

The ring 92 bears at its outer periphery on a bead of the disc 70, formed at the inner periphery of the latter, and at its inner periphery on an abutment element of the damper plate 36, which is inclined down to this level from the bead on which the ring 91 engages.

A space exists between the disc 70 and the reaction plate 31, the thickness of which decreases from the inner periphery to the outer periphery of its friction surface 33, so as to reduce its overall axial dimensions.

The crown element 8 lies radially outwards of the outer periphery of the skirt portion 32 of the reaction plate 32.

This is made possible by virtue of the improvement in resistance to centrifugal force of the first mass 2 within a given reduced radial dimension.

To this end, and in accordance with the invention, the first mass 2 is in two parts at its outer periphery, namely the support plate 22 which is of mouldable material, and the crown element 8, which is of steel. The said crown element 8 is thus heavier than a cast crown, leading to an increase in inertia.

In this example, the plate 24 is a casting and centres the crown element 8.

In accordance with the invention, the crown element 8 is mated over the outer periphery of the support plate 24 and is immobilised in the axial direction, and locking is then carried out by seaming, leading to a plastic flow of the material of the crown element 8 radially towards the axis of the assembly, and to the fastening of the said crown element 8 on the outer periphery of the plate 24 (i.e. on the outer edge of the latter).

More precisely, the support plate 24 has at its outer periphery, considered in axial succession going towards the crown element 8, a first hoop surface 60, an inclined immobilising surface 61, a second surface 62, a seaming shoulder 63, and a third, mounting, surface 64; the diameter of the third surface 64 is greater than that of the second surface 62, which has a diameter greater than that of the first surface 60. The three surfaces 60, 62, 64 are annular in form and are oriented axially, while the shoulder 63 is oriented transversely, with the surface 61 constituting a surface that joins the surfaces 60, 62 together.

The third surface 64 is joined to a transversely oriented terminal stop shoulder 65 which constitutes the free end of the outer periphery of the plate 24, and which is offset axially with respect to the projecting elements 26 in a direction towards the damper plate 36. Thus, and in accordance with one feature of the invention, a radially projecting cylindrical collar portion 63, 64, 65 is defined at the outer periphery of the plate 24 for fastening the crown element 8, which thereby projects axially.

The crown element 8, which is of elongate form in the axial direction, has, on its flank 80 whereby it is fastened to the plate 24, an internal, transverse, frontal shoulder 81, which is arranged to come into contact with the terminal shoulder 65, and which is extended by an axially oriented annular fitting surface 82, for cooperating with the third or mounting surface 64, on to which it is fitted and centred.

The flank 80 thus defines an internal shouldered housing 81, 82 for mounting the collar portion 63, 64, 65.

The surface 82 is initially (i.e. before assembly) longer than the surface 64, and the metallic crown element 8 has a reduced thickness in the region of the end of its flank 80 delimited by the surface 82. This thickness accordingly decreases in the axial direction going from the shoulder 81 to the end of the flank 80. At the end of the flank 80 there is thus formed an axially projecting portion which is adapted to be upset radially inwardly into contact with the seaming shoulder 63, so as to form a radial wing portion 83 for axial location purposes, which is directed radially towards the axis of the assembly. In the other axial direction, the crown element 8 is in abutment, through its shoulder 81, against the shoulder 65.

The crown element 8 is thus stepped at its outer periphery, with the flank 80 having at its outer periphery a diameter which is smaller than that of the outer periphery of the main part of the crown element 8. Thus, the pinion 125 of the starter is able to engage radially outwardly of the end of the flank 80 so as to drive the starter crown 25.

It will be noted that the bending of the wing portion 83 is easy, due to the fact that the crown element is of steel, and that the surfaces 62, 63 define a seating for the wing portion 83.

Thus, the surface 82 is fitted axially over the mounting surface 64, preferably in a tight fit, and then, the shoulder 81 being in contact with the terminal shoulder 65, the material of the projecting portion of the flank 80 is upset radially inwardly into contact with the seaming shoulder 63, so as to form the above mentioned radial wing portion 83. In this way, fastening of the crown element 8 on the plate 24 is obtained by seaming and telescopic cooperation, with the crown element 8 being immobilised both radially and circumferentially on the outside edge of the plate 24.

The starter crown 25 is subsequently fitted on to the plate 24. To this end, and in a manner known per se, the crown element is heated, and it is slipped axially on to the hoop surface 60 until the said crown 25, which has an internal chamfer, comes into abutment against the immobilising surface 61, the chamfer of the crown 25 being dimensioned and configured as a function of the complementary surface 61.

After this fitting operation, the wing portion 83 is trapped axially between the shoulder 63 and the crown 25.

Thus, because of the crown 25, the wing portion 83 cannot become bent outwardly again during operation. The useful life of the damped flywheel is therefore improved, and additional security is achieved.

It will be noted that, since the plate 24 is a casting, the latter may be made with complex profiles which are easily obtained by moulding, especially for the formation of the sleeve portion 27, the hub 21, and the projecting elements 26, and for the accommodation of the springs 4, and that this gives the benefit of a reduction in the number of components.

As a result of this, it is possible to fit a channel-shaped protective member 93, which is for example of metal, between the inner periphery of the annular peripheral flange of the first mass 2—which is constituted by the crown element 8 and the associated outer peripheral portion of the plate 24—and the springs 4.

This member 93 prevents fretting of the springs 4 in the said flange.

The corresponding seating formed in the plate 24 is then easy to form by moulding. The corresponding seating formed in the internal bore of the crown element 8 is also easy to make.

In one embodiment, these seatings are machined after the crown element 8 has been fixed to the support plate 24.

It will be noted that the disc 70 may readily be sealingly secured to the steel crown element by welding.

To this end, the crown element 8 defines a change of internal diameter on the same side as its free edge 85, so as to form a shoulder 86. The disc 70 then has at its periphery, in contact with the shoulder 86, a transverse terminal portion which is extended internally by an axially oriented annular portion in contact with the inner periphery of the crown element that has the smallest diameter. This axial portion is extended by a generally transversely oriented portion, which is directed towards the axis of the assembly and which has the embossed portion 71.

The terminal transverse portion of the disc 70 is then welded, preferably by laser welding so as to protect the grease, into contact with the inner periphery of the crown element 8 having the largest diameter.

In operation, the damper plate 36, through its arms 38, actuates the springs 4 which couple the first mass 2 elastically to the damper plate 36 and to the second mass 3.

The springs 4, in engagement on the projecting elements 26 and the embossed portion 71, are thus compressed, and friction occurs in the manner described above as the ring 54 is brought into action.

The invention is of course not limited to the embodiment described. In particular, fastening of the disc 70 to the crown element 8 may be obtained by sealed seaming, in the manner described in the document FR-A-92 10 958 published under the number 2 695 579.

The crown element 8 may be provided with teeth at its outer periphery, so as to constitute a starter crown. In that case, the crown 25 of FIG. 1 has no teeth. It will be appreciated that in every case, the crown 25 (whether or not it has any teeth) constitutes a hoop which reinforces the resistance of the support plate 24 to centrifugal force. This hoop 25 is offset axially with respect to the lugs 38 of the damper plate and with respect to the springs 4.

It is fitted in alignment with the main part of the plate 24, being mounted on the hoop surface 60. Its internal bore 260 includes an axially oriented cylindrical portion, which is extended by a flared portion 261 that cooperates with the immobilising surface 61, the profile of which is complementary to that of the flare of the hoop 25.

The surface 61 may be curved or of any other form, depending on the form of the flare of the hoop 25. The mounting surface 64 then projects axially with respect to the main part of the plate 24, and in particular, its projecting elements 26 and the shoulder 65 have a smaller height than in the prior art.

Thanks to this arrangement, there is a thin band of material between the hoop 25 and the springs 24, which can thus be fitted on a very large diameter, with the steel crown element 8 being highly resistant to centrifugal force. The springs 4 are thus fitted partly radially inwardly of the immobilising surface 61. This surface 61 is accordingly part of a band of material joining the collar portion 63–64, 65 to the main part of the support plate 24.

By comparison with a cast crown element of lighter weight, it is therefore possible to elongate the crown element 8 axially, thus obtaining the benefit of an additional gain in inertia.

Figure 2:
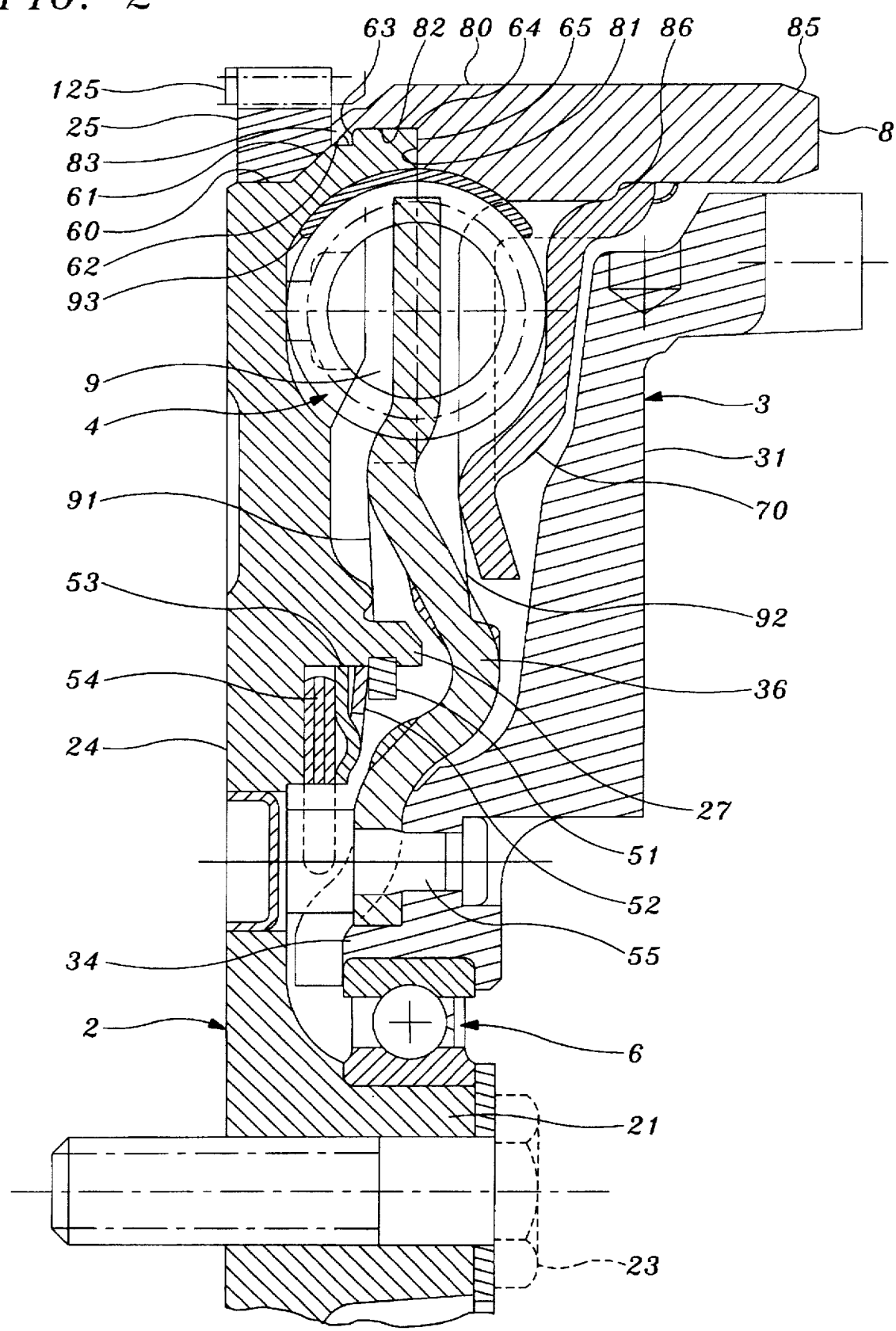
FIG. 2 is a view on a larger scale of the upper part of FIG. 1.

This elongation firstly enables the disc 70 to be welded axially further away, so as to preserve the grease in the cavity 9, while giving very good centring of the disc 70, and secondly, it enables a housing to be formed for the pinion 125 of the starter (FIG. 2).

Figure 3:
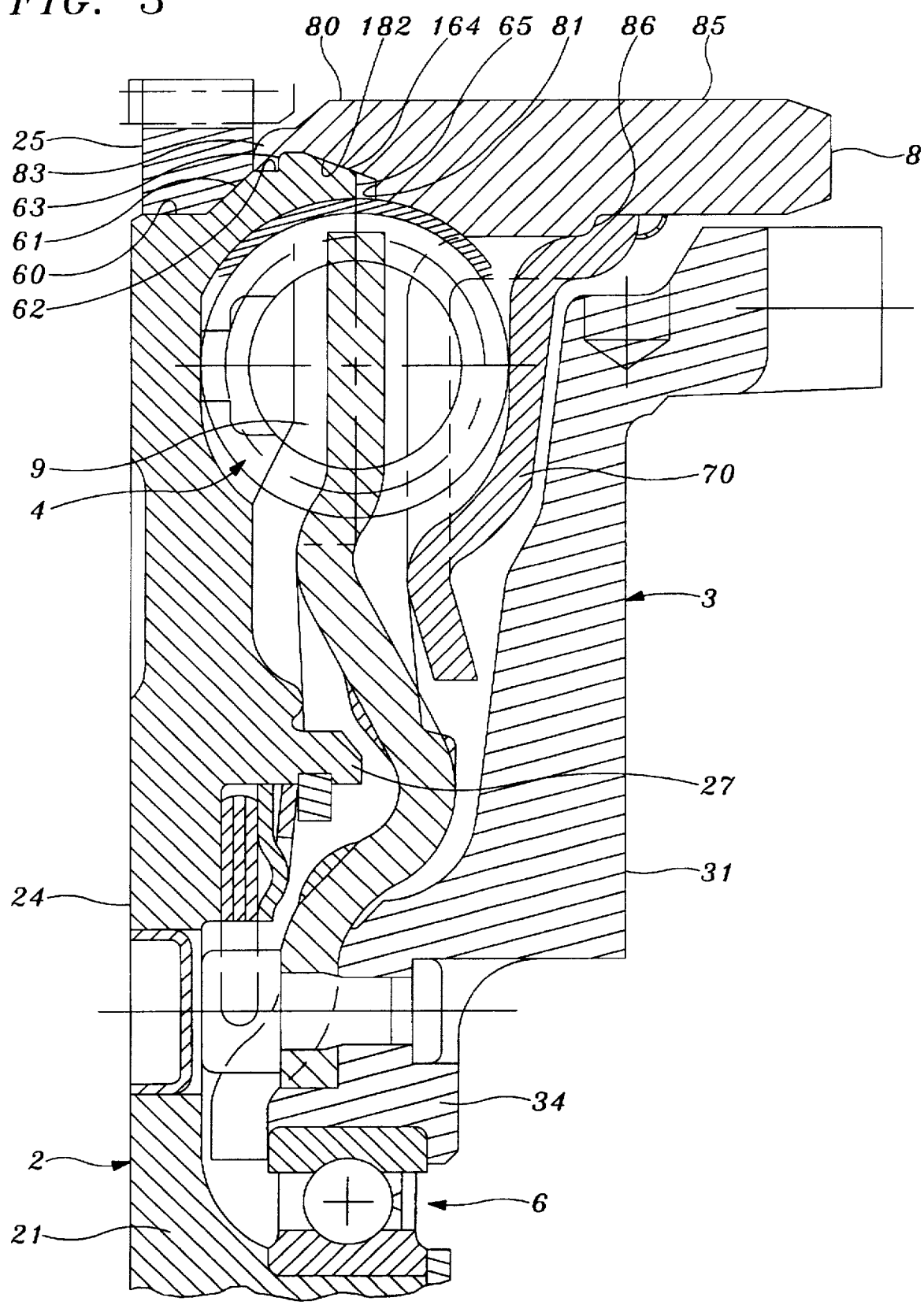
FIG. 3 is a view similar to FIG. 2 for another embodiment.

In another version (FIG. 3), the mounting surface 164 and engagement surface 182 may be oriented generally axially, having complementary frusto-conical profiles. In this case, the shoulder 81 in FIG. 2 is not operative. The same is true of the shoulder 65. The seaming shoulder may be generally transverse, and slightly inclined.

Similarly, the surface 62 may be oriented generally axially and be slightly inclined.

The end of the fastening flank which is adapted to be upset into contact with the seaming shoulder may be continuous, or it may be divided annularly into lugs.

The crown element may be force-fitted in the press on to the cylindrical or frusto-conical mounting surface.

The tighter the fit so obtained, the less will be the force required in the region of the upset end of the free flank in order to locate the crown element axially.

All of this depends on the application.

The support plate 24 may be of a material having an aluminium or magnesium base, while the inertia of the first mass 2 is high due to the presence of the crown element 8.

It will be appreciated that the complex form of the plate 25, in combination with the serpentine form of the disc 36, enables the friction means to be fitted radially outwardly of the internal hub 21, so that there is an opportunity for coupling in the root zone between the main portion of the plate 24 and the hub 21.

This root zone is very rigid. In addition, the outer hub 34 projects axially towards the plate 24, with axial size being reduced and the rigidity of the reaction plate 31 being increased.

I claim:

1. A damped flywheel comprising two masses (2, 3) mounted for movement of one with respect to the other against the action of circumferentially acting resilient members (4), namely a first mass (2) adapted to be fixed to a driving shaft and a second mass (3) adapted to be fixed to a driven shaft for rotation therewith, in which the first mass (2) comprises a support member (24) for an axially oriented crown element (8) which is mounted at the outer periphery of the support member (24), with a seaming member being interposed between the support member (24) and the crown element (8) for fastening them together, wherein the support member (24) comprises a support plate (24) of mouldable material, the crown element (8) is of steel, the support plate (24) has at its outer periphery a collar portion (63, 64, 65–63, 164, 65) projecting radially with an axially oriented mounting surface (64–164) and a transversely oriented seaming shoulder (63), and the crown element (8) has a fastening flank (80) for fastening to the support plate (24), defining an internal housing for said collar portion, with a radial wing portion (83) and a fitting surface (82, 182) which is oriented axially and being fitted over the mounting surface (64, 164), said radial wing portion (83) contacts the seaming shoulder (63) so as to fasten the crown element (8) on the support plate (24), and wherein the fastening flank (80) is of reduced thickness in the region of the fitting surface (82, 182).

2. A flywheel according to claim 1, wherein the support plate (24) is made of a casted material.

3. A flywheel according to claim 1, wherein the collar portion (63, 64, 65) of the support plate (24) is cylindrical and has, on either side of its axially oriented mounting surface (64), two transverse shoulders (63, 65), namely the seaming shoulder (63) and a terminal stop shoulder (65) for cooperation with a transversely oriented frontal shoulder (81) of the housing (81, 82), formed in the free flank (80) of the crown element (8) for this purpose, and wherein the engagement surface (82) of the crown element (8) is oriented axially.

4. A flywheel according to claim 1, wherein said collar portion projects axially at the outer periphery of the support plate (24) in which the support plate carries projecting elements (26) for engagement with the circumferentially acting resilient means (4), wherein said collar portion projects axially with respect to said protecting elements (26).

5. A flywheel according to claim 1, in which the support plate (24) carries at its outer periphery a hoop (25) wherein the radial wing portion (83) of the fastening flank 180) is trapped axially between the said hoop (25) and the seaming shoulder (63).

6. A flywheel according to claim 5, wherein said hoop (25) has an internal bore formed with a flare for cooperation with an immobilising surface (61) of complementary profile, formed on the support plate at an outer periphery thereof, and the hoop (25) is offset axially with respect to resilient members (4).

7. A flywheel according to claim 6, wherein said resilient members (4) are fitted partly radially inwardly of said immobilising surface (61).

8. (Amended) A flywheel according to claim 7, wherein the immobilising surface (61) is part of a thin band of material joining said collar portion to the main portion of the support plate (24).

9. A flywheel comprising two masses (2, 3) mounted for movement of one with respect to the other against the action of circumferentially acting resilient members (4), namely a first mass (2) adapted to be fixed to a driving shaft and a second mass (3) adapted to be fixed to a driven shaft for rotation therewith, in which the first mass (2) comprises a support member (24) for an axially oriented crown element (8) which is mounted at the outer periphery of the support member (24), with a seaming member being interposed between the support member (24) and the crown element (8) for fastening them together, wherein the support member (24) comprises a support plate (24) of mouldable material, the crown element (8) is of steel, the support plate (24) has at its outer periphery a collar portion (63, 64, 65–63, 164, 65) projecting radially with an axially oriented mounting surface (64–164) and a transversely oriented seaming shoulder (63), and the crown element (8) has a fastening flank (80) for fastening it to the support plate (24), defining an internal housing for said collar portion, with said radial wing portion (83) and a fitting surface (82, 182) which is oriented axially and being fitted over the mounting surface (64, 164), said radial wing portion (83) contacts the seaming shoulder (63) so as to fasten the crown element (8) on the support plate (24), and wherein the fastening flank (80) is of reduced thickness in the region of the fitting surface (82, 182), and wherein the collar portion (63, 164, 65, of the support plate (24) has a mounting surface (182) oriented axially and being of frusto-conical form, and the fitting surface of the crown element (8) has a frusto-conical form complementary to that of said mounting surface (164).

10. A flywheel comprising two masses (2, 3) mounted for movement of one with respect to the other against the action of circumferentially acting resilient means (4), namely a first mass (2) adapted to be fixed to a driving shaft and a second mass (3) adapted to be fixed to a driven shaft for rotation therewith, in which the first mass (2) comprises a support member (24) for an axially oriented crown element (8) which is mounted at the outer periphery of the support member (24), with a seaming member being interposed between the support member (24) and the crown element (8) for fastening them together, wherein the support member (24) comprises a support plate (24) of mouldable material, the crown element (8) is of steel, the support plate (24) has at its outer periphery a collar portion (63, 64, 65–63, 164, 65) projecting radially with an axially oriented mounting surface (64–164) and a transversely oriented seaming shoulder (63), and in that the crown element (8) has a fastening flank (80) for fastening it to the support plate (24), defining an internal housing for said collar portion, with said radial wing portion (83) and a fitting surface (82, 182) which is oriented axially and being fitted over the mounting surface (64, 164), said radial wing portion (83) contacts the seaming shoulder (63) so as to fasten the crown element (8) on the support plate (24), and wherein the fastening flank (80) is of reduced thickness in the region of the fitting surface (82, 182), said flywheel having friction members wherein the friction members are fitted on a sleeve portion (27) integral with the support plate (24), and the support plate (24) is recessed so as to accommodate the resilient members, and said sleeve portion (27) is located radially inwardly of the resilient members (4) and radially outwardly of a central internal bore formed in the plate (24).

* * * * *